United States Patent

Kilpatrick et al.

[15] 3,644,686

[45] Feb. 22, 1972

[54] TELEPHONE SET SWITCH-HOOK STOP

[72] Inventors: James McKinnon Kilpatrick; Gerd Kuhfus, both of London, Ontario, Canada

[73] Assignee: Northern Electric Company Limited, Montreal, Quebec, Canada

[22] Filed: Nov. 5, 1970

[21] Appl. No.: 87,149

[52] U.S. Cl. ....... 179/161
[51] Int. Cl. ....... H04m 1/08
[58] Field of Search ....... 179/159, 161, 164

[56] References Cited

UNITED STATES PATENTS 2,810,792 10/1957 Sargisson et al. ....... 179/159

*Primary Examiner*—William C. Cooper
*Attorney*—John F. Mowle

[57] ABSTRACT

A switch-hook stop for use in a telephone set switch-hook assembly which is operated by means of a force applied from the weight of a handset. When the housing is removed the switch-hook stop can be pivoted to place the switch-hook assembly in an onhook position. Replacing the housing automatically pivots the switch-hook stop out of the way and allows the switch-hook assembly to return to the off-hook position and to function normally thereafter.

2 Claims, 4 Drawing Figures

INVENTORS
JAMES M. KILPATRICK
GERD KUHFUS
BY John E. Mowle
PATENT AGENT

INVENTORS
JAMES M. KILPATRICK
GERD KUHFUS
BY John E. Moule
PATENT AGENT

TELEPHONE SET SWITCH-HOOK STOP

This invention relates to a switch-hook stop for a telephone set and more particularly to one which may be used to hold the switch-hook in the onhook position when the telephone housing is removed.

In the telephone industry it was found that on the occasion of performing service work, or installing certain kinds of telephone sets that a problem was experienced in keeping the line switch of the telephone in an onhook or a open position when an installer or repairman had the telephone housing removed. This problem was experienced in telephone sets which incorporated a handset cradle in the telephone set housing and mechanical coupling pins through which placement of the handset on the cradle would actuate the switch-hook arm which in turn would place the line switch into the onhook or open position, In those telephone sets having direct mechanical linkage between the handset and the switch arm, this problem did not exist. The problem associated with allowing the line switch of the telephone set to go into an off-hook or closed position during such periods is that the respective telephone circuit becomes engaged and unnecessarily ties up central office equipment.

A number of solutions have been proposed to solve this problem. In general, a latching means is used to hold the switch-hook arm, and thereby the line switch, in an onhook position while the telephone housing is removed. Following replacement of the housing, a separate unlatching device is employed to release the latch to permit the weight of the handset acting on the switch arm to place the line switch in the onhook position. One area of general difficulty experienced with this approach is that the latching and unlatching mechanism tends to become complicated and consequently expensive to manufacture. Secondly, if the mechanism is of the type that requires a separate operation to remove the latch, there will then occur the aggravating problem of the serviceman forgetting to unlatch the switch-hook arm, resulting in a second service call.

It is therefore an object of this invention to provide a switch-hook stop for use on a telephone set which may be manually set to keep the line switch in the onhook position when the telephone housing is removed.

A further object of this invention is to provide such a stop which will automatically disengage when the telephone housing is replaced, thereby permitting the weight of the handset to operate switch arm actuator pins which in turn move the switch-hook arm and consequently the line switch to an onhook position.

The preceding objects may be unrealized by recourse to the invention which comprises an improvement in a telephone set that includes a removable housing and a switch-hook. The switch-hook comprises a mounting bracket having a stop leg. Pivotally mounted on the bracket in a switch-hook actuating arm. In addition a spring is provided so as to urge the arm against the leg and into an off-hook position. The improvement itself comprises a switch-hook stop which is pivotally mounted on the arm. The stop includes a cam portion which spaces the arm from the leg when urged upwardly therebetween, thus putting the switch-hook in the onhook position. In addition, the stop has a free end for engagement with the housing when replaced so as to urge the stop downwardly out of engagement with the stop leg so as to return the switch-hook to the off-hook position.

An example embodiment of the invention will now be described with reference to the drawings in which.

Figure 1:
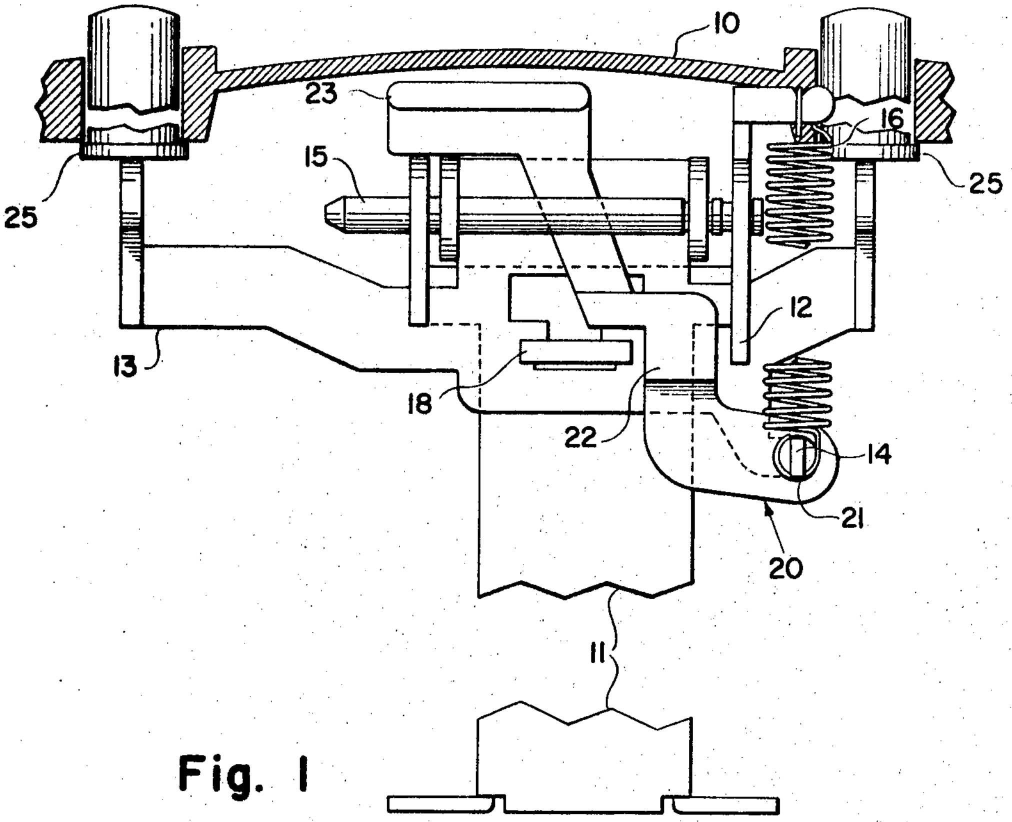
FIG. 1 is a front elevational view of a switch-hook assembly shown in an off-hook position.

Referring to FIG. 1, there is shown a section of a removable telephone housing 10 which forms part of a table model telephone set.

Figure 2:
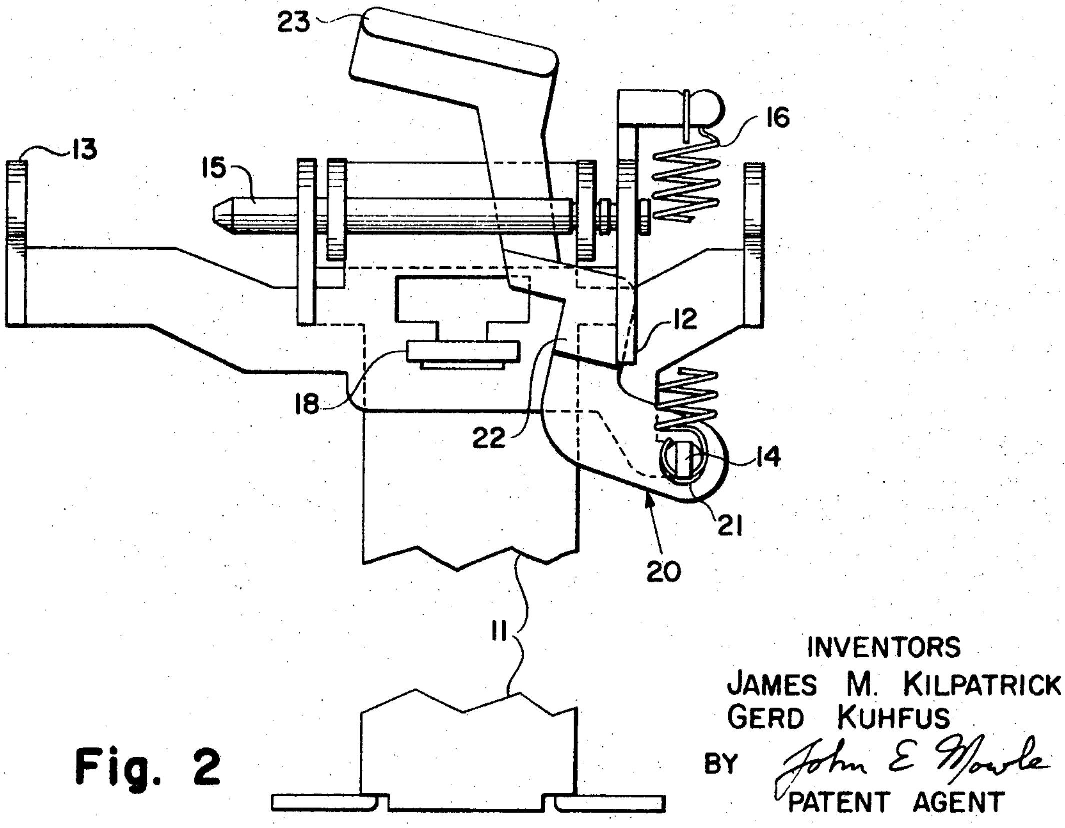
FIG. 2 is a front elevational view of the switch-hook assembly of FIG. 1 shown in an onhook position.
Figure 3:
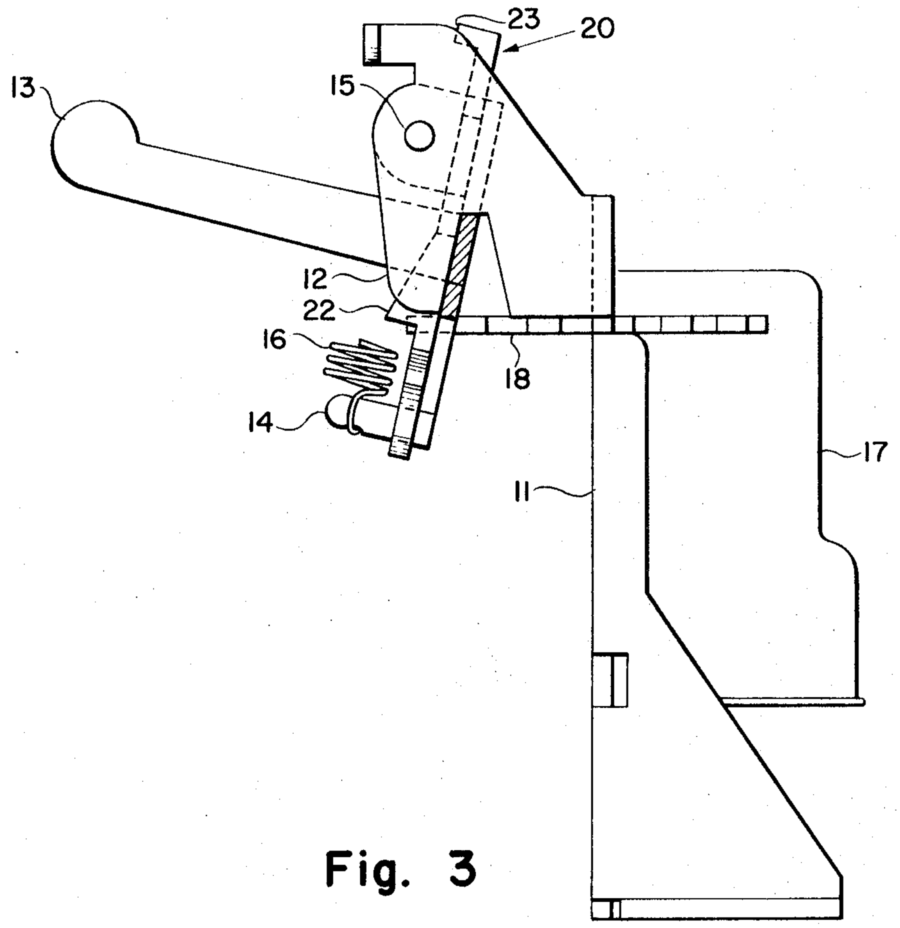
FIG. 3 is a side elevational view of the invention illustrated in FIG. 1.

Referring to FIGS. 2 and 3 as well, the switch-hook assembly comprises, a vertical mounting bracket 11 having a stop leg 12; and a switch-hook actuating arm 13 having a tab 14; the former being pivotally supported on the mounting bracket 11 by means of a pivot shaft 15. A coiled spring 16 (the middle section of which is shown as being cut away for clarity) is connected between the bracket 11 and the tab 14. The purpose of the coil spring 16 is to pivotally urge the switch-hook actuating arm 13 up against the stop leg 12 and into an off-hook position. A line switch 17, to which telephone circuit connections are made, is shown attached to one side of the bracket 11. Operation of the switch 17 occurs by means of a switch actuating card 18 that is mechanically connected between the switch-hook actuating arm 13 and the switch 17. The arm 13 in turn is actuated by a pair of actuating pins 25 when a handset (not shown) is placed thereon.

Figure 4:
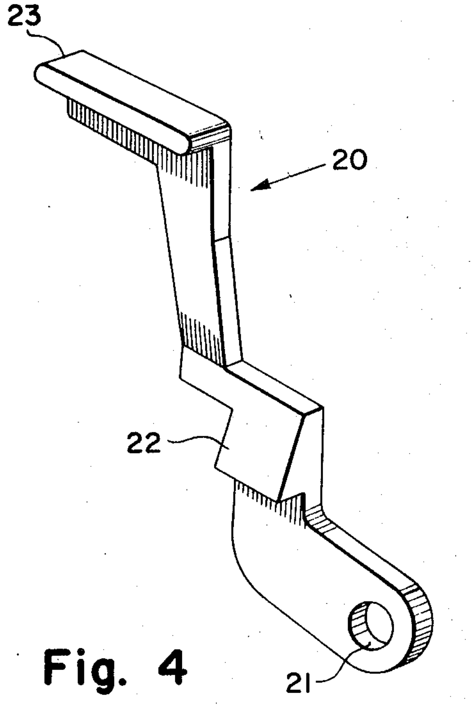
FIG. 4 is a perspective view of a captive stop which forms part of the switch-hook assembly shown in FIG. 1.

The figures further show a switch-hook stop 20 which has a hole 21 through which it is pivotally retained on the tab 14. The pivot shaft 15 confines the switch-hook stop 20 between the pivot shaft 15 and the switch arm 13 as may be seen in FIGS. 1, 2 and 3. To variably space apart the switch arm 13 from the stop leg 12, the switch-hook stop 20 includes a raised sloping surface or cam 22 which is clearly shown in FIG. 4. As shown in FIG. 1, the free end 23 of the switch-hook stop 20, is adapted to engage the housing 10 when it is in place on the telephone set.

In operation of the hook-switch assembly, removal of a handset (not shown) from the housing 10 permits the hook-switch arm 13 to travel to the off-hook position as shown in FIG. 1. Thereafter, the sloping surface of the cam 22 may be placed between the switch arm 13 and the stop leg 12 by depressing the arm 13 and manually lifting the switch-hook stop 20. This is illustrated in FIG. 2. When the switch-hook actuating arm 13 is released, the pressure on the cam 22 from the arm 13 holds the stop 20 in its raised position and the switch arm 13 in an onhook position. To release the stop 20, the switch arm 13 can be slightly depressed which will release the cam 22 and will allow the switch-hook stop 20 to fall to its rest position on the switch-hook actuating arm 13 as illustrated in FIG. 1. This is due to its offset center of gravity from the tab 14 around which the switch-hook stop pivots. Alternatively, of the telephone housing 10 is replaced, it will press against the free end 23 of the captive stop 20 and will physically push the cam 22 downward from between the stop leg 12 and the switch-hook actuating arm 13. This disengages the switch-hook stop 20 from the stop leg 12 and allows the switch-hook assembly to return to the off-hook position. Thereafter, the operation of the switch arm 13 will be responsive to the presence or absence of the telephone handset (not shown) to actuate the hook switch assembly into an onhook, or an off-hook position.

What is claimed is:

1. In a telephone set having a removable housing and a switch-hook, the switch-hook comprising, a mounting bracket including a stop leg;

a switch-hook arm pivotally mounted on said bracket; and spring means to urge against said arm against the stop leg and into an off-hook position;

the improvement comprising:

a switch-hook stop pivotally mounted on said arm;

the switch-hook stop having a cam portion to space the switch-hook actuating arm from the stop leg when raised upwardly between said arm and said leg, so as to place the switch-hook in an onhook position; and the switch-hook stop also having a free end portion for engagement with the removable housing when said housing is replaced so as to urge the switch-hook stop downward and out of engagement with the stop leg whereby the switch-hook returns to the off-hook position.

1. A telephone set as defined in claim 1 in which the center of gravity of the switch-hook is displaced from a line which runs vertically through the point which it is pivotally mounted on said arm so that when said arm is actuated, the switch-hook stop will fall out of engagement with the stop leg.

* * * * *